Jan. 23, 1962  G. L. GRANT ETAL  3,018,038
FARE COLLECTION AND CATEGORIZING APPARATUS
Filed May 28, 1957  7 Sheets-Sheet 1

Fig. 1

INVENTORS
Gardner L. Grant
James C. Hosken
by Roberts, Cushman & Grover
ATTORNEYS.

Jan. 23, 1962 G. L. GRANT ETAL 3,018,038
FARE COLLECTION AND CATEGORIZING APPARATUS
Filed May 28, 1957 7 Sheets-Sheet 4

Jan. 23, 1962 G. L. GRANT ETAL 3,018,038
FARE COLLECTION AND CATEGORIZING APPARATUS
Filed May 28, 1957 7 Sheets-Sheet 6

Inventors
Gardner L. Grant
James C. Hosken
by Roberts, Cushman & Grover
Attys

United States Patent Office 3,018,038
Patented Jan. 23, 1962

1

3,018,038
FARE COLLECTION AND CATEGORIZING
APPARATUS
Gardner L. Grant, Providence, R.I., and James C.
Hosken, Jamaica Plain, Mass., assignors, by mesne
assignments, to Universal Controls, Inc., New York,
N.Y., a corporation of Maryland
Filed May 28, 1957, Ser. No. 662,098
28 Claims. (Cl. 235—29)

This invention relates to fare collection and registering apparatus of the kind disclosed in United States Patent No. 2,848,158, granted to Miller, August 19, 1958, and has for its principal object to provide means for counting the number of fares deposited therein of any given category. This is effected herein by combining with the aforesaid apparatus a memory for storing up the several components of the fare as a composite fare and then transferring it as a unit to a counter, there being a counter for each fare expected to be deposited, so that at the end of any given period the several counters indicate how many fares of each kind were deposited during that period. The memory includes a commutator and stepping device for expediting the registration of fares made up of coins of small denomination, quarters and/or tokens, means for effecting the transfer from the memory to the counter following a gap in the flow of coins between successive deposits of coins and means for restoring the system to a zero condition after each cycle of operation.

Still other objects and advantages of the apparatus will appear hereinafter in connection with the following description and by reference to the accompanying drawings wherein.

2

Figure 2:
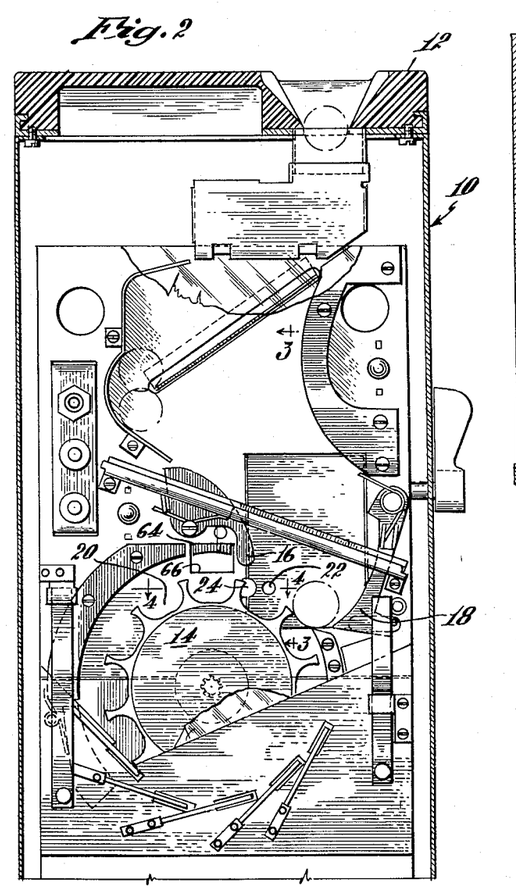
FIG. 2 is a section looking from the front, in a plane parallel to the front face of the coin supporting plate.
Figure 3:
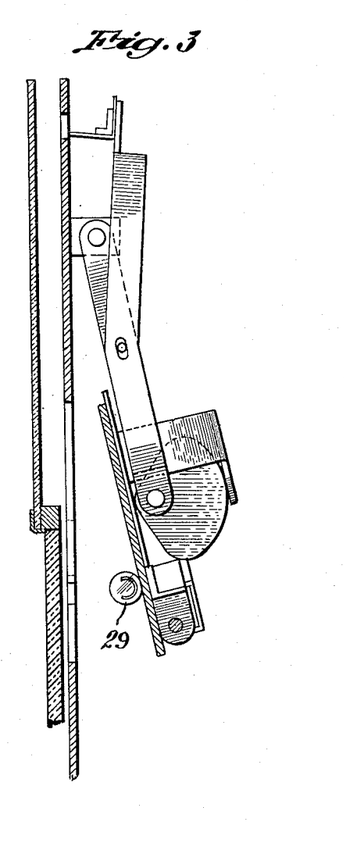
FIG. 3 is a section substantially on the line 3—3 of FIG. 2 showing the discharge or scavenger opening for bad coins and the door closure therefor in open position.
Figure 4:
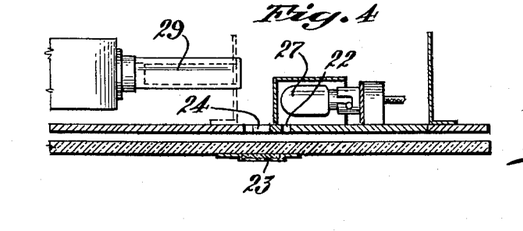
FIG. 4 is a fragmentary section, to larger scale, substantially on the line 4—4 of FIG. 2, showing the relative position of the photocell and its exciter lamp, said cell and lamp constituting detector means whereby the motor is energized in response to the passage of a coin.

The invention relates to means for use with the power driven fare collection and registering apparatus which forms the subject matter of pending application Serial No. 216,703, filed March 24, 1951, for counting the categories of coins deposited in that apparatus. As disclosed in the aforesaid application, the apparatus has a housing 10, at the top of which is a hopper 12 into which coins making up the fare may be dropped. Below the hopper, internally of the housing (FIG. 2), there are means for conducting the coins downwardly over an inclined surface behind a transparent window to a feeding station where the coins one at a time enter one of a series of pockets 20 in a rotor 14. By means of suitable guides 16 and 18, the coins are made to enter the one of the pockets which is just to the right of the topmost pocket. Behind this pocket in the inclined surface there are two apertures 22 and 24 and behind the inclined surface (FIG. 4) are a light source 27 and a photoelectric cell 29. In front of the inclined plate between the apertures 22 and 24 there is fastened to the transparent window a mirror 23. The apertures, light source, photoelectric cell and mirror are so arranged that when no coin occupies the pocket just to the right of the top the light from the lamp 27 shines through the aperture 22, falls on the mirror and is redirected thereby rearwardly through the aperture 24 onto the photoelectric cell. The photocell operates a skip switch SW$s$ (FIG. 18), in such fashion that when a coin drops into the pocket 20 just to the right of the top a motor M$^1$ will be started to produce a cycle of operation of the apparatus, which will be hereinafter called a "working cycle," following by a second cycle of operation, which will be hereinafter called an "empty cycle," there being no coin in the pocket during the second cycle and at the end of the second cycle there still being no coin in the pocket, will interrupt the motor circuit and stop the apparatus.

The skip switch SW$s$ will be disclosed hereinafter in connection with the circuit diagram.

Figure 1:
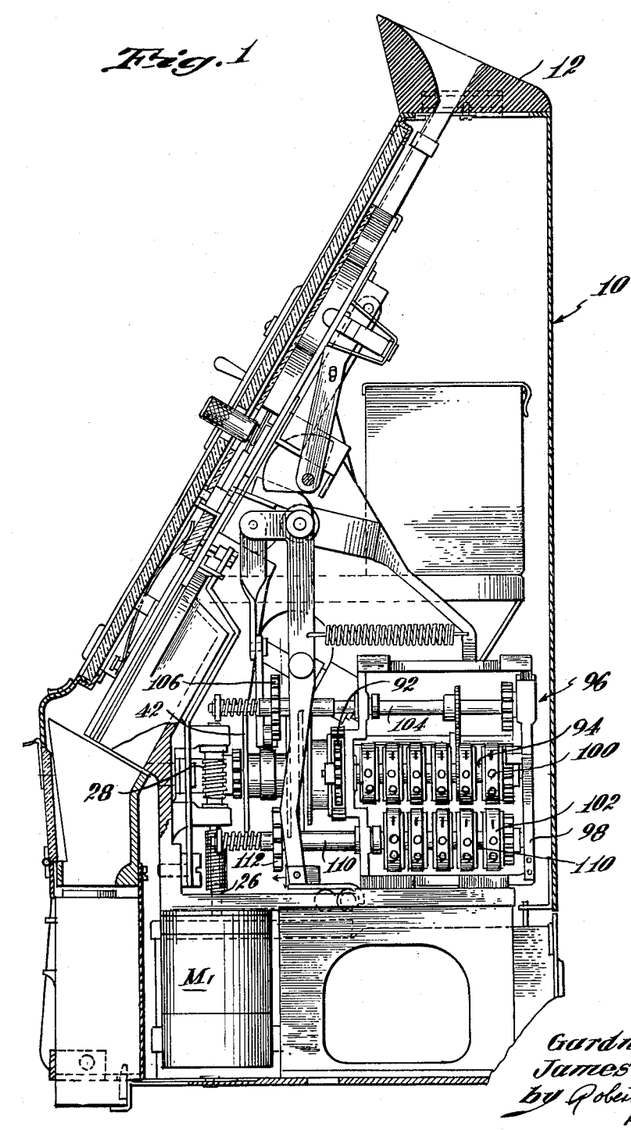
FIG. 1 is a central, vertical section through an electrically operated fare collection and registering machine embodying the present invention, the support upon which it rests being omitted.
Figure 6:
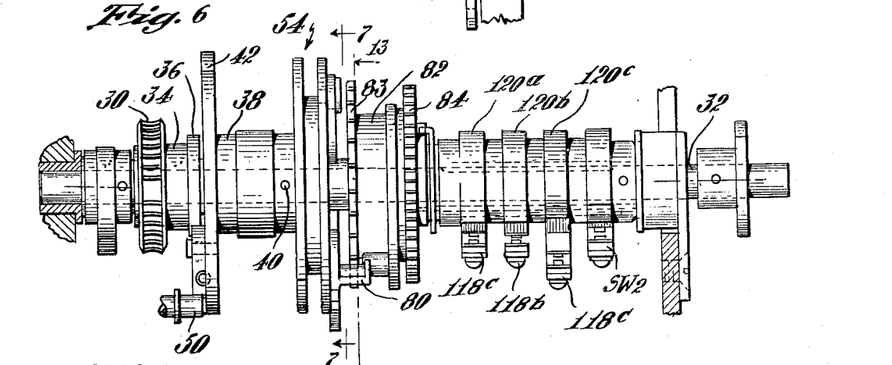
FIG. 6 is an elevation of a main shaft assembly.
Figures 8, 9:
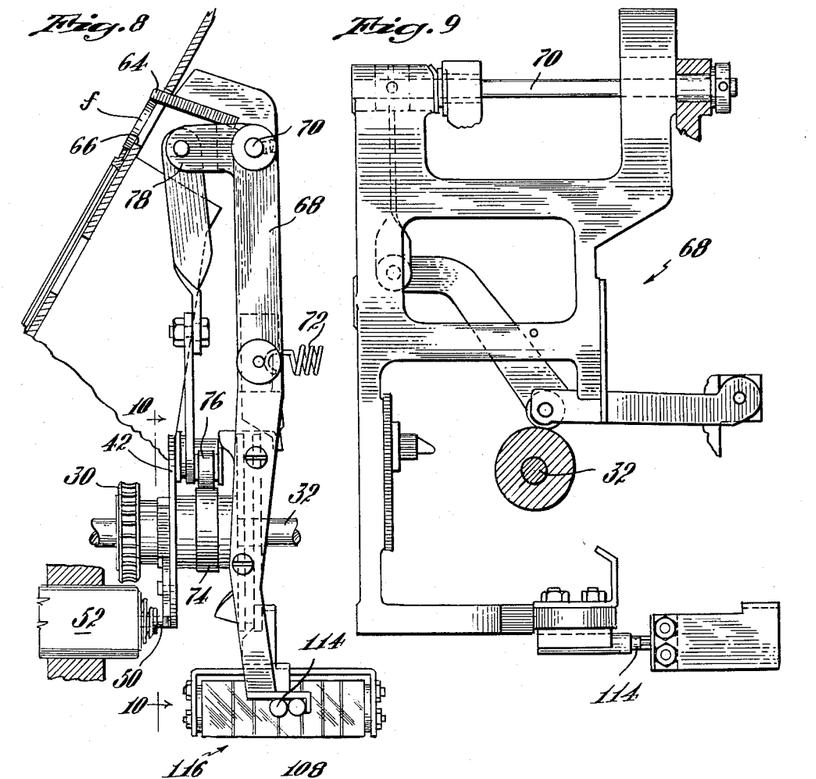
FIG. 8 is an edge elevation of the coin gauging element and associated parts.
FIG. 9 is a rear elevation of the gauging arm and its operating lever.
Figure 10:
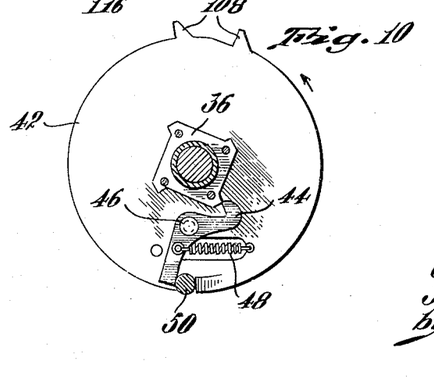
FIG. 10 is a section taken on the line 10—10 of FIG. 8.

The motor M$^1$ (FIG. 1) has a drive shaft 26 which rotates a worm shaft 28. The worm shaft engages a worm wheel 30 (FIGS. 6 and 8), mounted to turn on a horizontal shaft 32, which shaft comprises the main drive shaft of the apparatus. The worm wheel 30 has a hub 34 to which there is fastened a ratchet wheel 36 (FIG. 10). Adjacent the ratchet wheel there is a sleeve 38, which is fixed to the shaft 32 by a pin 40. The left-hand end of the sleeve has fast to it a disk 42 which has on it a latch 44, pivoted at 46 and yieldably held by means of a coil spring 48 engaged with the ratchet wheel 36 so that as long as the latch 44 engages the ratchet wheel rotation of the worm wheel 30 will effect a corresponding rotation of the disk 42 and hence of the shaft 32. The latch may be held out of engagement with the ratchet wheel by a pin 50 which is movable into and out of the path of rotation of the latch. A spring holds the pin in the path of the latch and a solenoid 52, of which the pin is the core, is operable to withdraw the pin. The solenoid is connected in the above-mentioned motor circuit so as to be energized simultaneously with the energization of the motor to withdraw the pin 50 when a coin is deposited, thereby to permit the latch to clutch the disk 42 to the worm and hence produce rotation of the main shaft. Absence of a coin in the pocket at the end of the empty cycle will de-energize the solenoid and hence permit the pin to intercept the latch, thereby declutching the main shaft.

Figure 5:
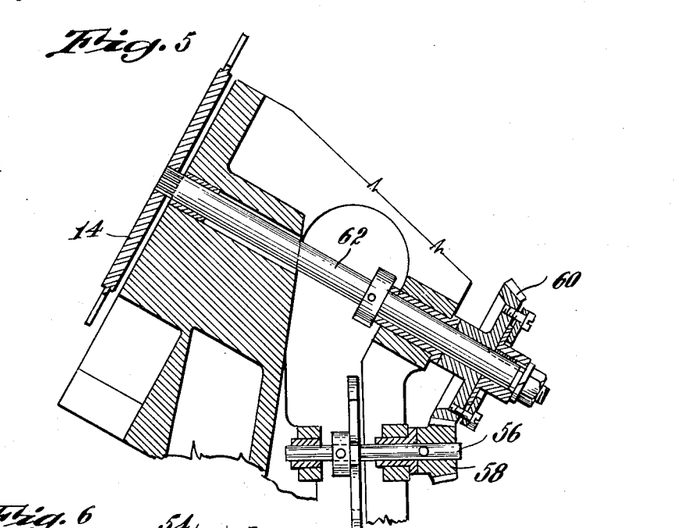
FIG. 5 is a fragmentary section in the vertical plane of the axis of the coin receiving rotor showing the rotor shaft and the gear train for driving it.
Figure 11:
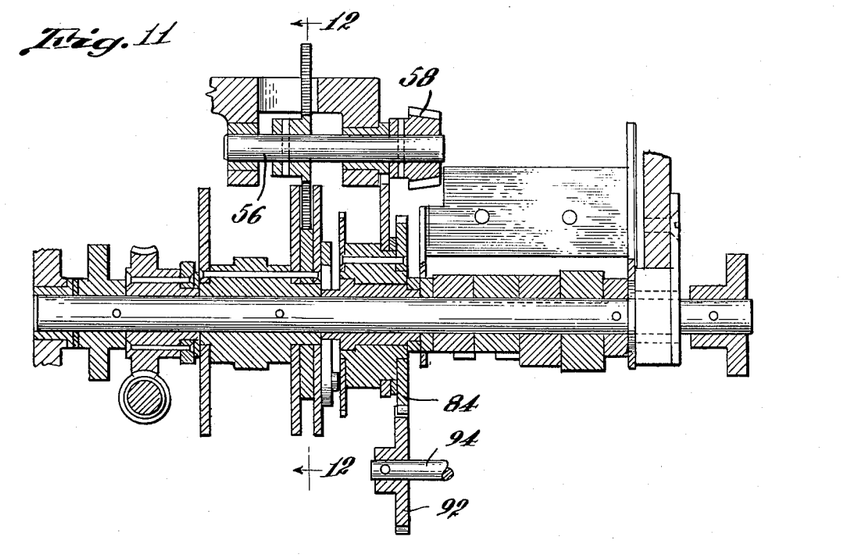
FIG. 11 is a section in the axial plane of the shaft shown in FIG. 6, showing its relation to other elements of the mechanism.
Figure 12:
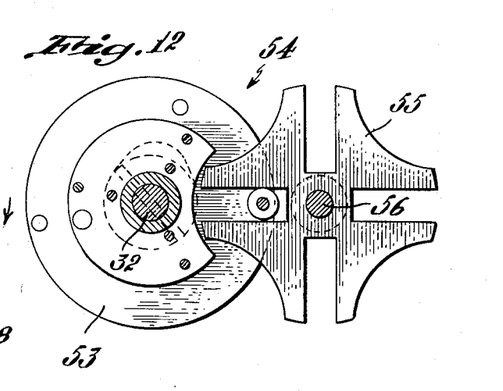
FIG. 12 is a section on the line 12—12 of FIG. 11.
Figure 13:
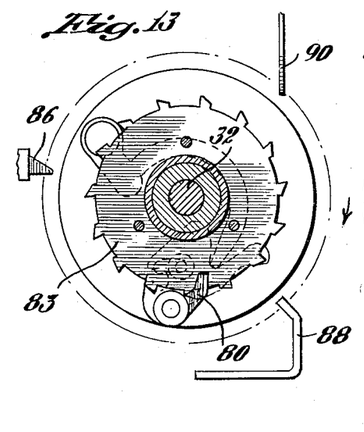
FIG. 13 is a section on the line 13—13 of FIG. 6.

At the right-hand end of the sleeve 38 there is a Geneva mechanism 54 (FIGS. 6 and 12), having a part 55 which operates through a countershaft 56 (FIGS. 5, 11 and 12), gears 58 and 60 and an inclined shaft 62 to turn the rotor 14, 1/12 of a rotation for each complete rotation of the main shaft. In other words, rotation of the main shaft 32 through one revolution by way of the aforesaid Geneva mechanism will turn the rotor 14 just far enough to advance the pocket within which a coin is resting one step, from its position just to the right of the top to the top position beneath a gauge finger at a coin gauging station.

At the coin gauging station there is a gauge finger 64 (FIGS. 2 and 8), which extends through an aperture 66 in the inclined surface, located above and behind the topmost pocket of the rotor so as to have contact with the upper edge of a coin $f$ seated in the pocket. The gauge finger 64 extends rearwardly and is fastened to the upper part of a downwardly extending arm 68 pivoted for swinging movement on a horizontal shaft 70, so that it swings forwardly and rearwardly axially of the main shaft 32. A spring 72 urges the arm rearwardly and if no coin occupies the pocket the arm will rest at its most rearward position against a stop. There is fixed to the main shaft 32 a cam 74 which turns with the main shaft and through a cam follower 76 and suitable linkage connected to a finger 78 on the arm 68 will rock the arm forwardly as the shaft commences to rotate to cause the rotor to turn so as to permit a coin in the pocket to pass beneath the gauge finger 64. The cam promptly releases the aforesaid linkage so that the gauge comes to rest on the top of the coin (FIG. 8) and thus holds the arm 68 in a given angular position depending upon the diameter of the coin in the pocket. At this point that part of the Geneva mechanism driving the countershaft discontinues so that the rotor stops while the main shaft continues to rotate.

Figure 7:
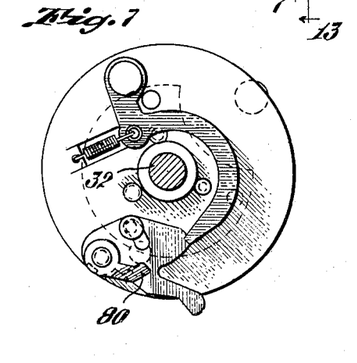
FIG. 7 is a transverse section taken on the line 7—7 of FIG. 6.

The right-hand end of the part of the Geneva mechanism fast to the main shaft continues to turn and has mounted on it a latch 80 (FIGS. 6 and 7) which travels circumferentially of the axis of the shaft 32 during its rotation. Adjacent this same end of the Geneva mechanism there is a sleeve 82 which is loose on the shaft and which has fast to its left end a ratchet wheel 83 and at its right end a gear 84. The teeth of the ratchet wheel 83 travel in a plane which coincides with the plane of travel of the latch 80. Normally the latch 80 is held out of engagement with the teeth of the ratchet wheel by suitable means but may be moved into a position to engage the teeth of the ratchet wheel so as to clutch the ratchet wheel and cause it to rotate with the shaft 32. By releasing or operating the latch 80 at different points in the angular rotation of that part of the Geneva mechanism 53 fast to the shaft 32, it is apparent that the ratchet wheel 83 may be caused to turn different angular distances.

The latch 80 is operated to bring it into engagement with the ratchet wheel by the position of the gauge arm 68 which in turn is determined by the diameter of the coin lodged between the gauge finger and the pocket at the top of the rotor. This is effected by one of several trips 86, 88 and 90 carried by the arm, only one of which will engage the latch at any given time and its engagement will be determined by the angular position of the arm. The ratchet wheel 83 has on it fifteen teeth and the trips are so located that for each deposite equaling a unit, that is, one penny, the ratchet wheel will be turned one step.

The gear 84 is, of course, correspondingly turned so that it rotates one division for each penny deposited, five divisions for each nickel, ten divisions for each dime and so forth. The gear 84 meshes with a gear 92 (FIG. 11) fast to the shaft 94 of a mechanical counter 96 (FIG. 1), such as shown in the pending application of Frank P. Rosapepe, Serial No. 610,814, filed September 19, 1956. This counter has its own supporting frame 98 which is fastened within the housing adjacent the main shaft and is adapted to total the fares deposited. This particular counter is designed to count pennies, nickels, dimes and quarters on one row of counter disks 100 and tokens on a second row 102 of counter disks. The first counter disk in the row 100 is fast to the shaft 94 so that it rotates one step for each step in the rotation of the shaft 94. In accordance with conventional construction when the count of 9 is reached on the first disk this is transferred as a unit to the second disk. In like manner when the second disk has made a complete revolution its count is transferred as a unit to the third disk and so forth. Contra to the usual counter, however, quarters are counted in on this row through a countershaft 104 which operates through a train of gears to add in two steps to the second disk of the row 100 whenever a quarter is deposited in the machine. Without going into the details of the mechanism which is shown in the aforesaid application, this is effected by a sliding gear 106, splined to shaft 104, which is moved by the gauge arm 68 when a quarter is deposited to bring it into engagement with the disk 42. The disk 42 has on it two teeth 108 (FIG. 10), by means of which the gear 106 is rotated two steps. The remaining five cents of the quarter is added to the first counter disk through one of the strips on the arm which effects rotation of the ratchet wheel through five steps. The counter disks of row 102 which count tokens are mounted on a shaft 110 and this too has on it a sliding gear 112 which is moved by the arm 68 to a position to have contact with a single tooth disk on the main shaft, not shown herein, so that for each rotation of the main shaft the shaft 110 will be turned on step, thereby to add up the number of tokens deposited.

Figures 17, 18:
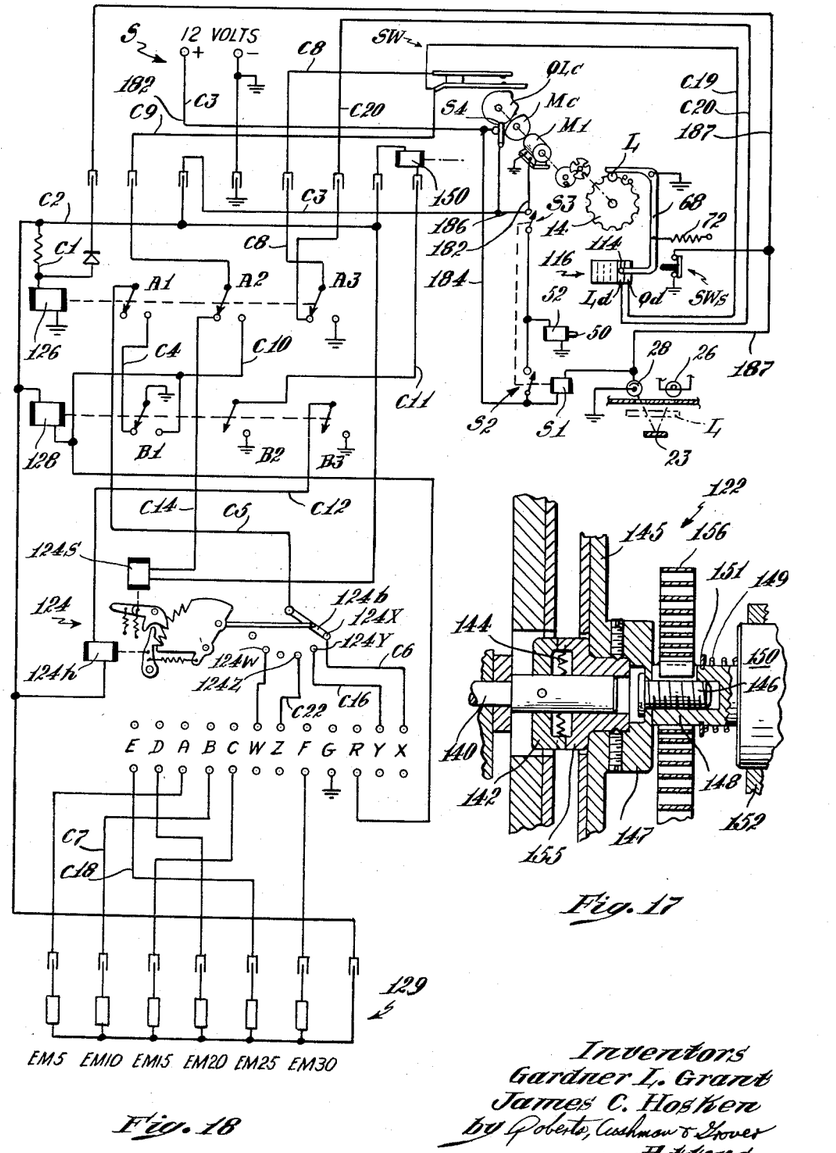
FIG. 17 is an enlarged vertical section of a fragmentary portion of the memory taken axially thereof.
FIG. 18 is a wiring diagram showing the operation of the system as a whole.

At the lower end of the arm 68 (FIGS. 1, 8 and 9) there is a brush 114 which is swingable with the arm relative to a bank of commutator blocks 116, these blocks being insulated one from the other. Each of the blocks forms a part of an electric circuit. The several circuits have switches 118 (FIG. 6), which are normally opened but are adapted to be closed by cams 120, fast to the main shaft 32. During each rotation of the shaft 32 each of the switches 118 is closed, however, the only circuit which will be energized will be that which includes the commutator block engaged by the brush 114. Since the position of the brush 114 is determined by the denomination of the coin deposited the circuit energized will represent the denomination of the coins. The circuit may be employed for various purposes, such for example as ringing a distinctive bell one or more times. As herein employed, however, the positioning of the brush by the presence of a quarter or token in engagement with the corresponding commutator block is employed in conjunction with counting means which will now be described for the purpose of recording the categories of the various coins deposited. This means includes a commutator 122, a stepping switch 124, two relays 126 and 128 and the aforesaid skip switch SW$s$ (FIG. 18).

The commutator 122 is mounted in the housing adjacent the main drive shaft 32 and has a drive shaft 140 (FIG. 17) which is connected to the gear 84 on the main drive shaft 32 by a train of gears 132, 134, 136 and 138, the ratios of which are such that the gear 138 which is fast to the shaft 140 of the commutator is turned through an angular distance of 9° or 1/40 of a revolution for each penny deposited in the meter and correspondingly 45° when a five cent piece is deposited and 90° when a dime is deposited. The right-hand end of the shaft 140 has mounted on and fixed to it, a clutch disk 142 which in turn has on its right-hand face clutch teeth 144. A commutator disk 145 having a hub 147 at its center is supported for rotation about the axis of the shaft 140 by means of a pin 146 extending from the hub axially into a core rod 148 extending horizontally from a solenoid 150 which is supported on a post 152 fastened to the base 154 in axial alignment with the shaft 140. A clutch disk 155 is fixed to the hub so as to extend through a central hole in the disk and has teeth for mating engagement with the teeth on the clutch disk 142. Normally the clutch disks are held engaged when the solenoid is unenergized by a coil spring 149 mounted on the core rod with its ends bearing respectively on the solenoid housing and a shoulder 151 on the core rod. The core rod 148 is reciprocal in its coil and may be drawn toward the right by energization of the solenoid to disengage the clutch disk so that rotation of the shaft 140 will not produce the corresponding rotation of the disk 145 and so that the commutator disk 145 may be returned to its zero position as will appear hereinafter.

Figure 14:
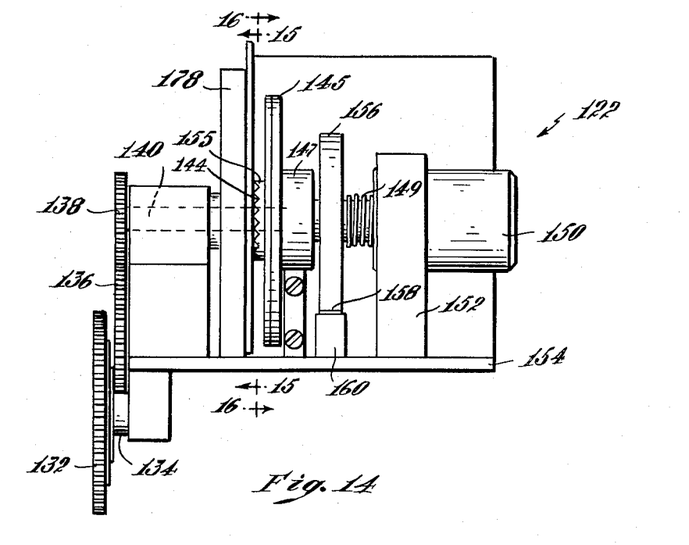
FIG. 14 is an elevation of a commutator portion of the memory device removed from the apparatus.
Figure 16:
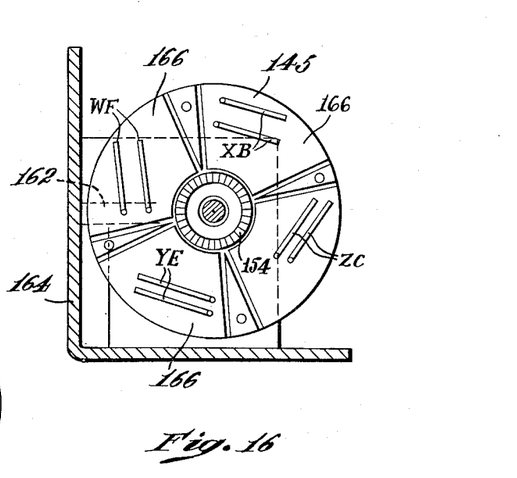
FIG. 16 is a vertical section taken on the line 16—16 of FIG. 14.

A clock spring 156 (FIG. 17) is mounted on the core rod 148 with its inner end fastened to the hub 147 and its outer end fastened by a screw 158 to a block 160 on the base. The spring is put under tension so as normally to urge the commutator disk to turn in a counterclockwise direction when viewed from the left-hand end of FIG. 14. The hub has on it a positioning block 162 (FIG. 16) and the base has on it in turn a positioning block 164 and these positioning blocks are held engaged by the tension of the clock spring at a zero position, to which position the disk will return from a displaced position as soon as the clutch disks are disengaged.

The commutator disk 145 (FIG. 16) is comprised of a non-conducting material and has on its left-face four circumferentially spaced segments 166 formed, for example, by the so-called printing process in which a conductive material is applied to the surface and then etched to remove the material from certain parts and hence to insulate them from each other. Each segment has fastened to it a pair of contacts or brushes in the form of flat elastic springs X—B, Y—E, Z—C and W—F, which are fastened at one end to a segment and stand outwardly therefrom at their other ends.

Figure 15:
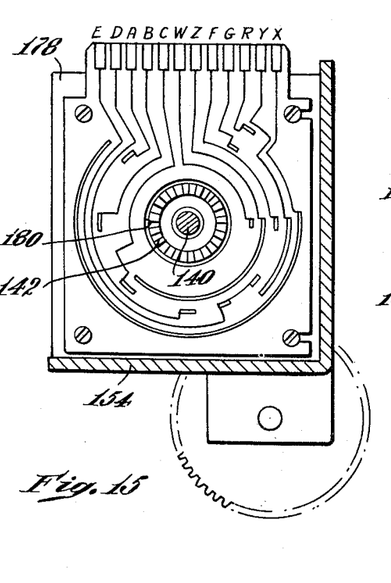
FIG. 15 is a vertical section taken on the line 15—15 of FIG. 14.

The commutator plate 178 (FIG. 15) is fastened to the base in an upright position perpendicular thereto and to the axis of the shaft 140 with its surface parallel to the commutator disk. The commutator plate has through it an opening 180 through which the shaft 140 passes and which is large enough to accommodate the clutch disk 142. On the face of the commutator plate there are several concentrically arranged conductors or slip rings which may be bridged by the brushes so as to form a current path from one to the other through the pairs of brushes, as will subsequently be related. As shown, the printed slip rings are twelve in number, distributed about the plate and each has connected to it a terminal, the latter being distributed along the upper edge of the plate in spaced relation and are identified, as herein shown, from left to right E, D, A, B, C, W, Z, F, G, R, Y and X.

The commutator as just described is illustrated diagrammatically in FIG. 18, in association with the stepping switch 124, relays 126 and 128, parts of the fare registering apparatus and a series of electromechanical counters 129, together with circuitry therefor, as will now be described.

Referring to the diagram (FIG. 18), there is shown a conductor 182 and it is from this socket that power is supplied to the motor M¹, which when energized initiates cycling the fare collection apparatus, if a coin is deposited in the machine, and which through the skip switch SWs, previously referred to, adds an empty cycle to the operation of the apparatus when a gap occurs in the stream of coins deposited, for example, as between deposits. In use, successive deposits are not made fast enough so that one deposit becomes mixed with another. In other words, the machine operates fast enough so that each deposit is registered before the succeeding deposit is made.

For the purpose of illustration, if a ten cent piece is deposited in the hopper 12 of the fare collection apparatus it will fall into the pocket of the rotor which is in registry with the photoelectric means, consisting of the lamp 26, mirror 23 and cell 28. Interception of the light by the coin falling into the pocket energizes a solenoid S¹, which closes two switches S2 and S3, so that power from the source S is supplied to the motor M¹. At the same time solenoid 52 is energized to withdraw the pin 50 to permit the ratchet 44 to engage the ratchet wheel 36 on the main shaft and hence to commence rotation of the main shaft 32 and to lift the gauging arm 68 to permit the coin to be moved therebeneath and to cause the mechanical counter 96 to count ten units. Movement of the coin beyond the pocket opposite the light source results in the solenoid S¹ being de-energized. However a cam Mc on the main shaft 32 having engagement with a switch S4, which is normally open, closes this switch as soon as the shaft starts to turn, so as to close a circuit from the source S through a conductor 186, to the motor M¹, so as to keep it running. As the motor continues to rotate the main shaft the mechanical counter, through the gear train related heretofore, will turn the commutator disk 145 through ten steps, that is, through an angular distance of 90° so as to move the pair of brushes X—B until their ends engage respectively, the slip ring X and the slip ring B, thereby bridging the same. Each step represents a unit, to wit, a hundredths of a dollar, so that five steps is five cents, ten steps is ten cents, etc. At the end of the working cycle the motor would normally be stopped by opening of the cam operated switch S4, except for the skip switch SWs which adds an empty cycle to the rotation of the shaft. The skip switch SWs which is normally closed, that is, when there is a coin beneath the gauging arm, is grounded at one side and is connected at its other side by a conductor 187 to the solenoid S1. Hence if there is a coin under the gauge arm 68 the latter is held out of contact with the skip switch and consequently at the end of the cycle the motor is again energized by grounding of the solenoid S1 through the skip switch so that the switches S2 and S3 are closed and hence complete a circuit to the motor. Initial movement of the main shaft will lift the gauge and allow the coin beneath it to move beyond, whereupon the gauge arm will swing rearwardly by reason of its spring 72 to a position in which the trip carried thereby will not actuate the latch on the ratchet wheel and hence no rotation will be imparted to the counter or to the commutator disk 145 which is geared thereto. At the end of the empty cycle, there being no coin beneath the gauge arm, the latter will have moved rearwardly and opened the skip switch so that it cannot initiate a second empty cycle. The rearward movement of the gauge arm takes place early in the empty cycle and by opening the skip switch, energizes the relay 126 by removing the ground through conductor 187 which normally short circuits its operating coil. It is now connected to the motor circuit by conductors c1, c2 and c3. Energization of the relay 126 shifts contacts A1, A2 and A3 from the left-hand position shown to the right-hand position. Shifting of the contacts A1 to the right-hand position grounds wiper arm 124b of the stepping switch 124 through conductors c4 and c5. The stepping switch normally occupies its home position with its wiper arm 124b engaged with a terminal 124X on the stepping switch. This terminal 124X is connected by a conductor c6 to the terminal X on the printed circuit on the commutator plate. As previously pointed out the commutator disk has already been turned through ten steps so that the pair of brushes X—B bridge the slip rings X—B. The terminal B on the commutator plate is connected by a conductor c7 to one of the electromechanical counters EM10 and as a result an impulse is sent to the counter which advances a ratchet therein, one tooth with reference to a ratchet wheel within it in conventional fashion but without making a count.

Shifting of the contacts A2 and A3 to the right operates to make a circuit through the combined quarter-token switch SW which as heretofore related is closed by a cam QLc on the main shaft 32 so as to ground the relay 128 by way of a conductor c8, the aforesaid quarter token switch SW, conductor c9, contact A2 and conductor c10. Energization of relay 128 shifts contacts B1, B2 and B3 to the right. Shifting of the contact B1 to the right opens the circuit through contact A1 so that it returns to the left-hand position, thereby breaking the circuit to the counter EM10. This allows the ratchet therein to be retracted to effect a count. At the same time closing of the contact B1 operates as a hold-on switch for holding relay 128 engaged throughout the remainder of the cycle. Shifting of contact B2 to the right grounds the solenoid 150 of the commutator through conductor c11, thereby declutching the commutator disk 145 and allowing it to return to zero position under the influence of the clock spring 156. Simultaneously shifting of the contact B3 to the right grounds a homing solenoid 124h of the stepping switch 124 by way of conductor c12, so that the stepping switch is returned to a zero position if it has been moved therefrom. In this particular example the stepping switch was not shifted so the impulse sent to the homing solenoid will have no effect. Following restoration of the commutator to its zero position continued rotation of the main shaft 32 will open the motor circuit through the switch S4 and hence de-energize relays 126 and 128.

The same sequence of events takes place for deposit of any fare in denomination of pennies, nickels and dimes, up to twenty cents. The operation in the event of a deposit of a quarter or of a fare greater than a quarter which includes a quarter as one component of a deposit of tokens takes place as follows.

On deposit of a quarter the first thing that happens is that operation of the fare collection apparatus is initiated by the presence of a quarter in the pocket opposite the photoelectric means which energizes the solenoid $S^1$, which in turn closes the switches S2 and S3, energizes the solenoid 52 and starts the motor $M^1$, so as to permit the worm to drive the main shaft. This is accompanied by swinging of the gauge upwardly and advancing of the rotor to move the quarter beneath the gauge finger. The motor cam Mc takes over as soon as the coin moves away from the pocket opposite the light source so that operation of the motor continues, although the solenoid $S^1$ has been de-energized. By reason of the position of the gauge arm, the trip mounted thereon releases the latch on the Geneva mechanism at a position to engage the ratchet wheel on the main shaft 32 to cause rotation of the mechanical counter shaft five steps. This, of course, through the mechanical counter turns the commutator disk 145 through five steps. At the same time the slidable gear previously described is shifted into engagement with the two teeth of wheel 42 on the main shaft so that the latter is rotated thereby and in turn rotates the countershaft 104 of the mechanical counter two steps. This in turn indexes the second counter disk two steps thus registering twenty cents. The position of the gauge arm brings the brush at its lower end into alignment with the one of the commutator blocks Qd of the fare collection apparatus which is in the token-quarter switch circuit. The block Qd is connected directly to the lower leaf of the switch SW, which in turn is connected directly to the conductor c9 so that a single impulse is sent to the conductor c9. Since skip switch SWs at this time is closed there is no circuit through the relay 126 and it is unenergized. Consequently, the contacts A1, A2, and A3 occupy their left-hand positions as shown. Accordingly, the impulse produced by contact of the brush 114 with the commutator block Qd is sent through conductor c9, contact A2 at its left-hand position, and conductor c14, to the stepping switch solenoid 124s so as to step the wiper arm 124b from the terminal 124X to the terminal 124Y. Movement of the wiper arm 124b to terminal 124Y operates through conductor c16 to select through terminal Y a different pair of brushes Y—E on the commutator disk 145 which is twenty steps in advance of the brushes X—B. Since the commutator disk has already been advanced five steps by the mechanical counter, as heretofore related, the Y—E brushes will lead the X—B brushes by twenty-five steps, that is, the total of the five added in by the mechanical counter and the twenty added by the stepping switch 124 so that the brushes Y—E will bridge the slip rings Y and E. The slide ring E is connected by conductor c18 to the electromechanical counter EM25. However no impulse is sent thereto at this time since the switch $A^1$ is at its left-hand position. Following this the cycle will be completed and then be recommenced by the skip switch SWs, as previously explained, to turn through an empty cycle provided an additional coin has not been deposited in the pocket of the rotor. During the empty cycle there will, of course, be no quarter in the pocket beneath the gauge hence the gauge arm will be shifted rearwardly and will open the skip switch SWs. This as previously pointed out removes the ground to the relay 126 so as to shift the contact A1, A2 and A3 to the right. Since the stepping switch wiper arm 124b has already been shifted to the 124Y position, grounding of the stepping switch 124S through A1 in its right-hand position sends an impulse to the EM25 counter to advance the ratchet over the ratchet wheel. Shifting of switches A2 and A3 closes relay 128 through conductor c8, the quarter token switch Sw, conductor c9, switch A2 and conductor c10, which opens switch A1, thereby breaking the circuit through counter EM25. This allows the ratchet to be retracted to count. Shifting B2 and B3 to the right returns the commutator disk 145 and stepping switch 124 to zero position.

Following this the circuit is interrupted by the completion of rotation of the main shaft and opening of the switch 185.

If a token is dropped into the meter the motor $M^1$ is started, the solenoid 52 is retracted and the main shaft commences its cycle, as previously explained. This lifts the gauge finger and turns the rotor to move the token beneath the gauge. The gauge arm shifts the sliding gear thereon to a position in which it engages the single tooth wheel on the main shaft, thereby causing the mechanical counter to add one to the counter. Simultaneously the gauge arm brush makes contact with commutator block Ld and partially closes the circuit within which is located the quarter token switch SW.

The cam QLc on the main shaft 32 has two lobes, both of which operate so as to close the token switch SW twice, thereby sending two impulses by way of conductor c20, A3, c8, SW, conductor c9, contact A2 in its left-hand position and conductor c14 to the stepping switch solenoid 124s, thereby moving the wiper arm 124b from its home position 124X two steps over to terminal 124Z. The skip switch SWs during this time is closed so that the relay 126 is unenergized. Movement of the stepping switch wiper arm 124b to the 124Z terminal connects it by way of conductor c22 to the Z terminal on the commutator which selects a set of brushes Z—C on the commutator disk 145. The brushes Z—C are fifteen steps in advance of the X—B brushes. The Z—C brushes make contact with the slip rings Z and C so as to establish a circuit through the commutator to counter EM15. Now the cycle comes to an end and because of the skip switch SWs an empty cycle is commenced. As was pointed out previously as soon as the cycle starts the skip switch SWs opens, thus energizing the relay 126 and shifting of the switches A1 and A2 and A3 to the right. A1 grounds the stepping switch 124 through the Z—C brushes to advance the ratchet of counter EM15 one tooth. At the same time contacts A2 and A3 close relay 128 which in turn shifts contacts B1, B2 and B3 to the right. B1 breaks the circuit through the stepping switch 124 so that the ratchet is retracted, thereby counting. Switches B2 and B3 return the commutator disk 145 and stepping switch 124 to zero, thereby completing the operation.

If two tokens are deposited the operation takes place as previously described except that four impulses are sent to the stepping switch so that its arm will be moved from the 124X position to the 124W position and the counter EM30 will be caused to count.

It should be understood that the present disclosure is for the purpose of illustration only and that this invention includes all modifications and equivalents which fall within the scope of the appended claims.

We claim:

1. In a fare collection and registering apparatus designed to receive fares of different amount and different composition, a memory device, means operable by the coins of a deposit of coins to cause the memory device to store up the total of the coins making up the deposit, counters corresponding in number to the several fares the apparatus is designed to receive, and means operable after the last coin of a given deposit of coins to effect operation of said first means to transfer the total fare stored up in the memory device as a unit to the counter corresponding to that fare.

2. In a fare collection and registering apparatus designed to receive fares of different amount and different composition, a memory device adapted to have stored thereon at any given time any one of several fares of different category, a circuit containing the memory device, means in the circuit responsive to the individual coins making up a deposit to cause the memory device to total the several coins of that deposit, gauge means movable from an inoperative position to an operative position for identifying, respectively, the several categories of fare which the apparatus is designed to receive, counter means, means in the circuit responsive to the movement of the gauge means to its inoperative position following movement of the last coin in a given deposit beyond said gauging means to effect operation of the memory device, between successive deposits, to transfer the total of the deposit in terms of its category as distinguished from its monetary value to the one of the counter means corresponding to that category.

3. In a fare collection and registering apparatus, a memory device preconditioned to store up at any given time any one of several fares, gauge means movable from an inoperative position to an operative position by deposit of coins to cause the memory device to total the coins of the deposit, and means operable by movement of the gauge means to its inoperative position, following movement of the last coin in the given deposit beyond the gauge means to effect operation of the first-named means to cause the memory device to produce a signal if the fare deposited corresponds to one of the categories to which the memory was preconditioned.

4. In a fare collection and registering apparatus, a memory device for storing up the total of a plurality of coins deposited as a fare, gauge means operable by the deposit of coins to cause the memory device to total the several coins making up the fare, and means operable by the gauge means in the absence of coins, following movement of the last coin in a given deposit beyond the gauge means, to effect operation of the first-named means as between deposits to cause the memory device to produce a signal representing the total as a unit as distinguished from its monetary value.

5. In a fare collection and registering apparatus, a memory device adapted to have stored up thereon at any given time one of several fares of different category, a circuit containing the memory device, a coin gauge movable into and out of operative position, displacement of said gauge means being dependent upon the diameter of the coin, switch means in the circuit selectively operable by the displacement of the gauge means according to the diameter of the coins operable to cause the memory device to total the several coins and counters corresponding to the several categories of deposit for which the apparatus is designed, said switch means being operable following its operation by the last coin in a given deposit to transfer the fare stored upon the memory device, as a unit, to one of said counters to register the fare as a unit.

6. In a fare collection and registering apparatus, operating means adapted to have a number of cycles of operation, means operable by deposit of a fare made up of one or more coins to cause the cycling means to cycle once for each coin of the deposit plus an extra cycle, a memory device, means operable during each coin initiated cycle to determine its denomination and add it according to its denomination to the memory device, counting devices corresponding to the different fares which may be deposited and means operable during the extra cycle to transfer the total fare stored on the memory device as a unit to the one of the counting devices corresponding to that fare.

7. In a fare collection and registering apparatus, operating means adapted to have a number of cycles of operation, means operable by deposit of the fare made up of one or more coins to cause the cycling means to cycle once for each coin of the deposit plus an added cycle, a commutator, means operable during each coin initiated cycle to determine its denomination and to displace the commutator by an amount corresponding to the monetary value of the coin, said commutator being progressively displaced by the several coins making up the fare by an amount corresponding to the total fare, counting devices corresponding to different fares which may be deposited and means operable by the added cycle to transfer a signal representative of the totalized fare on the commutator at the end of its displacement as a unit to the one of the counting devices corresponding to that fare.

8. In a fare collection and registering apparatus, operating means adapted to have a number of cycles of operation, means operable by deposit of a fare made up of one or more coins to cause the cycling means to cycle once for each coin of the deposit plus an added cycle, a commutator including relatively movable elements, means operable during each coin cycle to determine the denomination of the coin and to effect relative movement of the commutator elements, to add up the several components of the fare on the commutator, counting devices corresponding to the different fares which may be deposited and means operable by the added cycle to transfer a signal representative of the total fare as a unit from the commutator to the one of the counting devices corresponding to that fare.

9. In a fare collection and registering apparatus, operating means adapted to have a number of cycles of operation, means operable by deposit of a fare made up of one or more coins to cause the cycling means to cycle once for each coin of the deposit, a commutator including relatively movable elements having a zero position from which the elements are moved by steps to count the total of the coins deposited, means operable during each coin cycle to determine the denomination of the coin and to displace the commutator elements a number of steps corresponding to the denomination of the coin, said commutator elements having a total displacement at the end of the several cycles corresponding to the total fare deposited, and counting devices corresponding to the several different totalled fares which may be deposited, said counting devices being operated to add a count of one for any displacement of the elements which correspond to one of the fares which the apparatus is designed to receive.

10. In a fare collection and registering apparatus, operating means adapted to have a number of cycles of operation, means operable by deposit of a fare made up of one or more coins to cause the cycling means to cycle once for each coin of the deposit, a commutator including relatively movable elements having a zero position from which they are movable step by step to add up the total of the coins deposited, means operable during each cycle to determine the denomination of the coin responsible for that cycle to add its amount in steps to the commutator by displacing its elements by that amount, counting devices and means operable by displacement of the commutator elements different amounts to record the fare as a unit on the counting device designed to record fares of that category.

11. In a fare collection and registering apparatus, operating means adapted to have a number of cycles of operation, means operable by deposit of a fare made up of one or more coins to cause the cycling means to cycle once for each coin deposited, a commutator having relatively movable elements, carrying contacts which make engagement at predetermined positions of relative rotation, a plurality of counters, means operably connecting the counters to one of the elements at several predetermined positions, which positions represent different fares, means operable during each cycle to move the other element to a position opposite the one element which corresponds to the deposited fare, means operable when a given displacement of the elements is reached by such relative movement to effect operation of the counter at that position and means for restoring the elements to their zero position following adding of the fare as a unit to the counter at that position.

12. In a fare collection and registering apparatus, operating means adapted to have a number of cycles of operation, means operable by deposit of a fare made up of one or more coins to cause the cycling means to cycle once for each coin deposited plus one, a commutator including a plurality of pairs of slip rings, said slip rings constituting spaced contacts in a circuit, pairs of brushes along the rings and operable at predetermined places to complete the circuit therethrough, counters in the circuit connected to one of the slip rings of each pair respectively, the several contacts corresponding to the different fares, means operable during each coin cycle to effect movement of the brushes by amounts corresponding to the deposited coins, said brushes having contact at the end of a given deposit with slip rings representing that amount of fare, and completing a circuit through the rings to the corresponding counter, and means operable during the added cycle to supply current through the commutator circuit to the counter associated with the rings on which the brushes rest to effect operation of the counter to add the fare thereto as a unit.

13. In a fare collection and registering apparatus, operating means adapted to have a number of cycles of operation, means operable by the deposit of a fare made up of one or more coins to cause the cycling means to cycle once for each coin of the deposit plus an added cycle, a commutator including a plurality of pairs of slip rings constituting spaced contacts, the several pairs representing different fares, brush means movable from a zero position along the rings, said brush means at predetermined positions bridging a pair of the slip rings representing a given fare, counters means operable by each coin cycle to shift the brush means a number of steps corresponding to the total value of coins deposited, and making contact at that point with rings which are connected to a counter operable to record that fare as a unit of one, means operable during the added cycle to supply current to the counter through the slip rings and brush means having contact therewith to effect operation of the counter, and means for restoring the brush means to its initial zero position.

14. In a fare collection and registering apparatus, operating means adapted to have a number of cycles of operation, means operable by deposit of a fare made up of one or more coins to cause the cycling means to cycle once for each coin of the deposit plus an added cycle, a commutator including a plurality of pairs of slip rings constituting spaced contacts, the several pairs representing different fares, brush means movable from a zero position along the rings, said brush means at predetermined positions bridging a pair of the slip rings representing a given fare, counters means operable by each coin cycle to shift the brush means a number of steps corresponding to the total value of each coin deposited, said brush means being shiftable by the several coins making up the fare to a position representing the total amount of the fare, and making contact at that portion with the rings which are connected to a counter operable to record that fare as a unit of one, a relay operable by commencement of the additional cycle to supply current to the counter through the commutator slip rings and brush means having contact to effect operation thereof, and a second relay operable by the first relay to return the brush means to its zero position.

15. In a fare collection and registering apparatus, operating means adapted to have a number of cycles of operation, means operable by deposit of a fare made up of a number of coins to cause the cycling means to cycle once for each coin of the deposit plus an added cycle, a commutator including a plurality of pairs of slip rings representing different fares, electrically operated counters connected to the several rings, a plurality of spaced brushes movable as a unit relative to the slip rings, there being a first pair of brushes having a zero position and successive pairs spaced therefrom by multiples of a unit, and means operable by coins of certain denominations to step the brushes along relative to the rings by an amount representing part of the value of the coin and for selecting a pair of brushes in advance of the first pair of brushes representing the rest of the value of the coin, so that the pair of brushes selected has contact with a pair of rings whose relative position to the zero position is the total value of the coin, and means operated by the added cycle to supply a current impulse through the contacting rings and brushes of the commutator to cause the counter connected thereto to count one.

16. In a fare collection and registering apparatus, operating means adapted to have a number of cycles of operation, means operable by deposit of a fare made up of a number of coins to cause the cycling means to cycle once for each coin of the deposit plus an added cycle, a commutator including a plurality of pairs of slip rings representing different fares, electrically operated counters connected to the several rings, a plurality of spaced brushes there being a first brush having a position representing a unit amount and successive pairs spaced therefrom by multiples of the unit, and means operable by coins of certain denominations to select a pair of brushes in advance of the first pair so that the pair of brushes selected has contact with a pair of rings whose relative position to the unit position is the total value of the coin, and means operative by the added cycle to supply a current impulse through the contacting rings and brushes of the commutator to cause the counter connected thereto to count one.

17. In a fare collection and registering apparatus, operating means adapted to have a number of cycles of operation, means operable by deposit of a fare made up of one or more coins to cause the cycling means to cycle once for each coin of the deposit followed by an extra cycle, a device operable during each coin-operated cycle to store up in unit amounts the value of the coin initiating that cycle, said device adding the amount of each coin successively, counting devices corresponding to the several sums that may be stored up by said first-named device and means operable during the extra cycle to transfer the fare stored up on the first-named device as a unit to the counting device corresponding thereto.

18. In a fare collection and registering apparatus, operating means adapted to have a number of cycles of operation, means operable by deposit of a fare made up of one or more coins to cause the cycling means to cycle once for each coin of the deposit followed by an extra cycle, means operable during the coin-operated cycle to store up the amount of the individual coins in units and aliquot parts thereof to total the entire amount of the deposited fare, counting devices corresponding to the several fares which may be deposited and means operable during the extra cycle to transfer the count by the first means to the counter corresponding to that fare as a unit.

19. In a fare collection and registering apparatus, operating means adapted to have a number of cycles of operation, a skip switch operable by deposit of a fare made up of one or more coins to cause the cycling means to cycle as many times as the number of coins in the deposit plus an added cycle, means operable during the coin-operated cycle to store up the amount of individual coins as a sum, counting devices corresponding to the various fares which are the sum of the several composite coins making up the fare, and means operable during the said one cycle to transfer the sum of the particular fare stored up during the working cycle to the counting device corresponding to that fare as a unit.

20. In a fare collection and registering apparatus, operating means adapted to have a number of cycles of operation, a skip switch operable to initiate a number of coin-operated cycles of operation of the apparatus corresponding to the number of coins deposited, plus an extra cycle, a memory device into which may be fed the sum of the several components of the fare deposited, means operable during the coin-operated cycle to add certain of the coins unit by unit and others as the sum of the entire number of units, said memory device having fed into it at the end of the coin-operated cycle the sum of the total fare, counters for recording the different fares deposited and means operable during the extra cycle for transferring the particular fare fed into the memory device to the counter of that category of fares as a unit.

21. In a fare collection and registering apparatus, coin gauging means, cyclically operable means for advancing each coin to said gauging means, means operable by the first coin of the deposit of coins to initiate operation of the cycling means, means operable by the gauging means to continue operation of the cycling means until the last coin leaves the gauging means, and other means operable during the last cycle of operation to register the composite fare as a unit.

22. In a fare collection and registering apparatus, coin gauging means, cyclically operable means for advancing each coin to said gauging means, means operable by the first coin of the deposit of coins to initiate operation of the cycling means, means operable by the gauging means to continue operation of the cycling means until the last coin leaves the gauging means, means operable during each cycle of operation to memorize the component parts of the total fare as a whole, and means operable during the last cycle to count the composite fare as a unit.

23. In a fare collection and registering apparatus, coin gauging means, cyclically operable means for advancing each coin to said gauging means, means operable by each coin of the deposit to initiate operation of the cycling means, means operable by the gauging means to continue operation of the cycling means until the last coin leaves the gauging means, means operable by the gauging means to add the monetary value of the coin at each cycle to a totaling counter, other means operable to totalize the individual fares as a unit of a specific category, and means operable during the last cycle of operation to transfer the fare totalized as a unit to a counter.

24. In a fare collection and registering apparatus, operating means adapted to have a number of cycles of operation, a memory device adapted to have stored up thereon at any given time one of several fares of different category, a circuit containing the memory device, a skip switch located in the path of the coins responsive to a deposit of coins as they commence flowing by it to initiate a cycle of operation of the apparatus and to cause the memory to total the several coins, counters in the circuit corresponding to the several categories of deposits to be made, a switch in that part of the circuit in which are located the counters for controlling operation of the same, said skip switch being operable by the last coin of a given deposit moving beyond it to add an extra cycle to the operation of the apparatus, said last-named switch being operable during the extra cycle to transfer the fare upon the memory device to the one of the counters corresponding to the fare as a unit.

25. In a fare collection and registering apparatus, a memory device adapted to have stored up thereon at any given time one of several fares of different category, comprised of coins and/or token pieces, a circuit including switch means, gauge means responsive to the diameter of a piece, said switch means being selectively operable, by the response of the gauge means to the diameter of each piece, to cause the memory device to total the several pieces, and a counter for each category of the deposits for which the apparatus is designed, said switch being operable, following its operation by the last piece in a given deposit, to transfer the fare stored up on the memory device, as a unit, to one of said counters to register the fare as a unit.

26. In a fare collection and registering apparatus, a memory device, coin-gauging means, means responsive to the coin-gauging means for totalling all of the coins gauged by said gauging means and other means responsive to the coin-gauging means operable, by the coins of a given deposit of coins, to cause the memory device to store up the total of the coins making up the given deposit, counters corresponding in number to the several fares the apparatus is designed to receive, and means operable, after the last coin of a given deposit of coins, to effect operation of the second-named means to transfer the total fare stored on the memory device, as a unit, to the counter corresponding to that fare.

27. In a fare collection apparatus according to claim 1, a coin support adapted to support coins side-by-side, motor means operable to move the coin support to advance each coin thereon in succession toward the gauging means, a first sensing device operable, by the first coin of a deposit of coins, to initiate operation of the motor means to move the first coin of the deposit into gauging position relative to the gauge, and a second sensing device operable each time a coin is moved into gauging position, to continue operation of the motor means independently of the first sensing device so as to advance the last coin of a deposit beyond the gauge means.

28. A fare collection apparatus according to claim 27, wherein the first and second sensing devices are switches.

References Cited in the file of this patent

UNITED STATES PATENTS

| | | |
|---|---|---|
| 548,243 | Wood | Oct. 22, 1895 |
| 1,309,954 | Martin | July 15, 1919 |
| 1,372,857 | Woodward | Mar. 29, 1921 |
| 1,799,784 | Donnellan | Apr. 7, 1931 |
| 2,374,321 | Bauer | Apr. 24, 1945 |
| 2,533,654 | Wilcox et al. | Dec. 12, 1950 |
| 2,594,422 | Gordon | Apr. 29, 1952 |
| 2,810,465 | Miller | Oct. 22, 1957 |
| 2,433,689 | Fry | Dec. 30, 1957 |